(12) United States Patent
Brennan

(10) Patent No.: US 7,331,556 B1
(45) Date of Patent: Feb. 19, 2008

(54) KEYBOARD AND MOUSE SUPPORT

(76) Inventor: Thad Brennan, 2617 S. Peck Rd., Monrovia, CA (US) 91016

( * ) Notice: Subject to any disclaimer, the term of this patent is extended or adjusted under 35 U.S.C. 154(b) by 400 days.

(21) Appl. No.: 10/965,442

(22) Filed: Oct. 13, 2004

(51) Int. Cl.
*A47B 91/00* (2006.01)

(52) U.S. Cl. .................. 248/346.01; 248/118; 248/918; 248/919; 312/208.1; 108/50.01; 108/50.02

(58) Field of Classification Search .......... 248/346.01, 248/118, 118.1, 118.5, 918, 919, 220.22, 248/220.21; 312/208.1, 223.3; 108/65, 108/66, 69, 90, 50.01, 50.02
See application file for complete search history.

(56) References Cited

U.S. PATENT DOCUMENTS

| | | | |
|---|---|---|---|
| 6,308,643 B1 * | 10/2001 | Cummings | 108/69 |
| 6,390,432 B1 * | 5/2002 | VanderHeide et al. | 248/346.01 |
| 6,467,737 B1 * | 10/2002 | Dorantes | 248/118 |
| 6,505,566 B1 * | 1/2003 | Foster et al. | 108/138 |
| 2002/0023994 A1 * | 2/2002 | De Shann | 248/346.01 |

\* cited by examiner

*Primary Examiner*—Kimberly Wood
(74) *Attorney, Agent, or Firm*—Allan H. Grant; The Walker Law Firm

(57) ABSTRACT

The present invention is for a keyboard and mouse support device, wherein said mouse support comprising a mouse platform adopted to support a mouse, a support bar, and a spacer, which is positioned between the bottom surface of said mouse platform and the top surface of said support bar, and one or more gaskets positioned against said spacer, and means for connecting said mouse platform, said spacer and said support bar to one another; wherein said mouse platform, said spacer, and said support bar are connected to one another, a slot is created in said mouse support between said bottom surface of said mouse platform and said top surface of said support bar; wherein a keyboard platform is thinner than said slot created between said bottom surface of said mouse platform and said top surface of said support bar, said keyboard platform is slidably connected into said slot of said mouse support; and said keyboard platform is adopted to support a keyboard. The invention also provides a method of using a keyboard and mouse support.

9 Claims, 9 Drawing Sheets

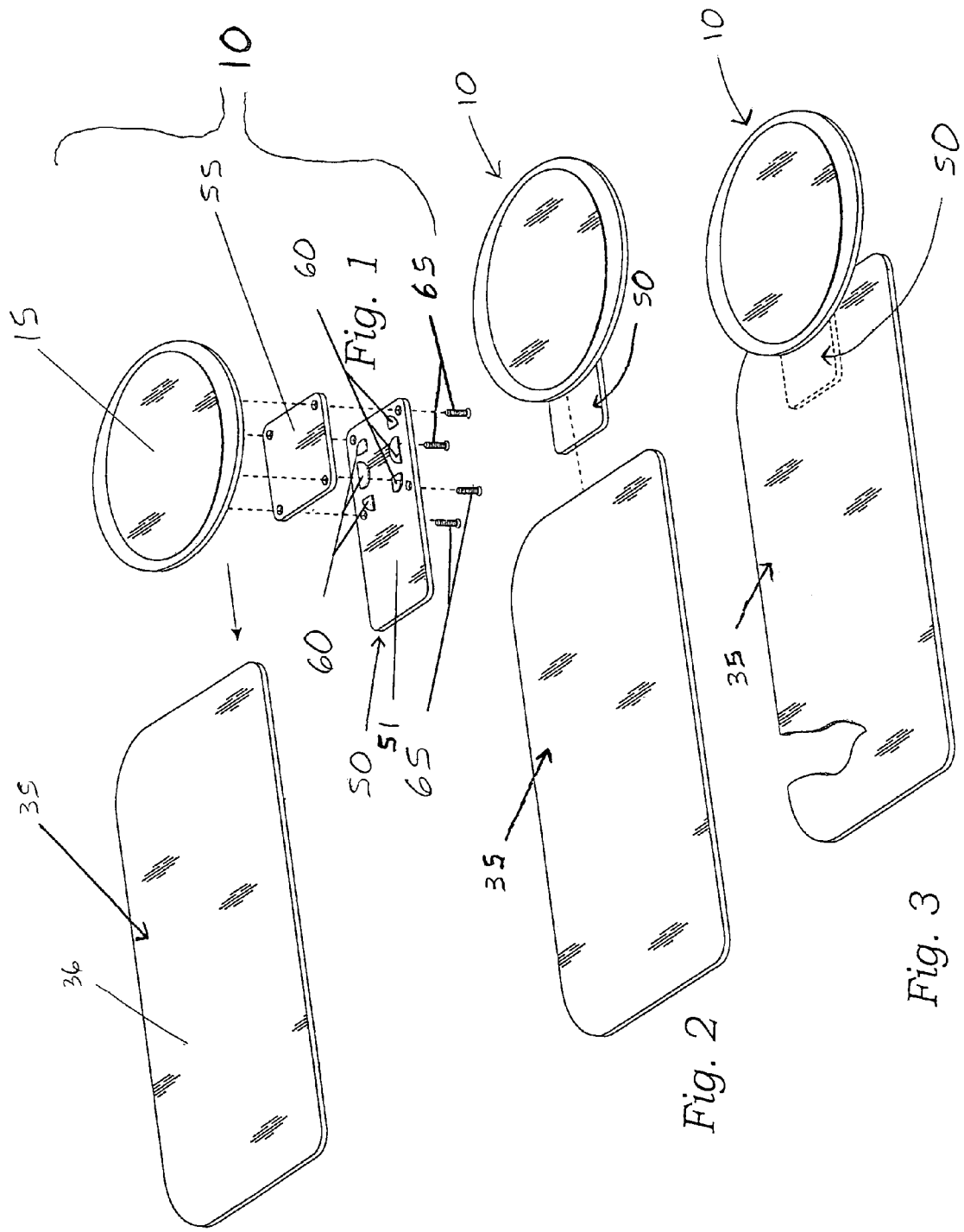

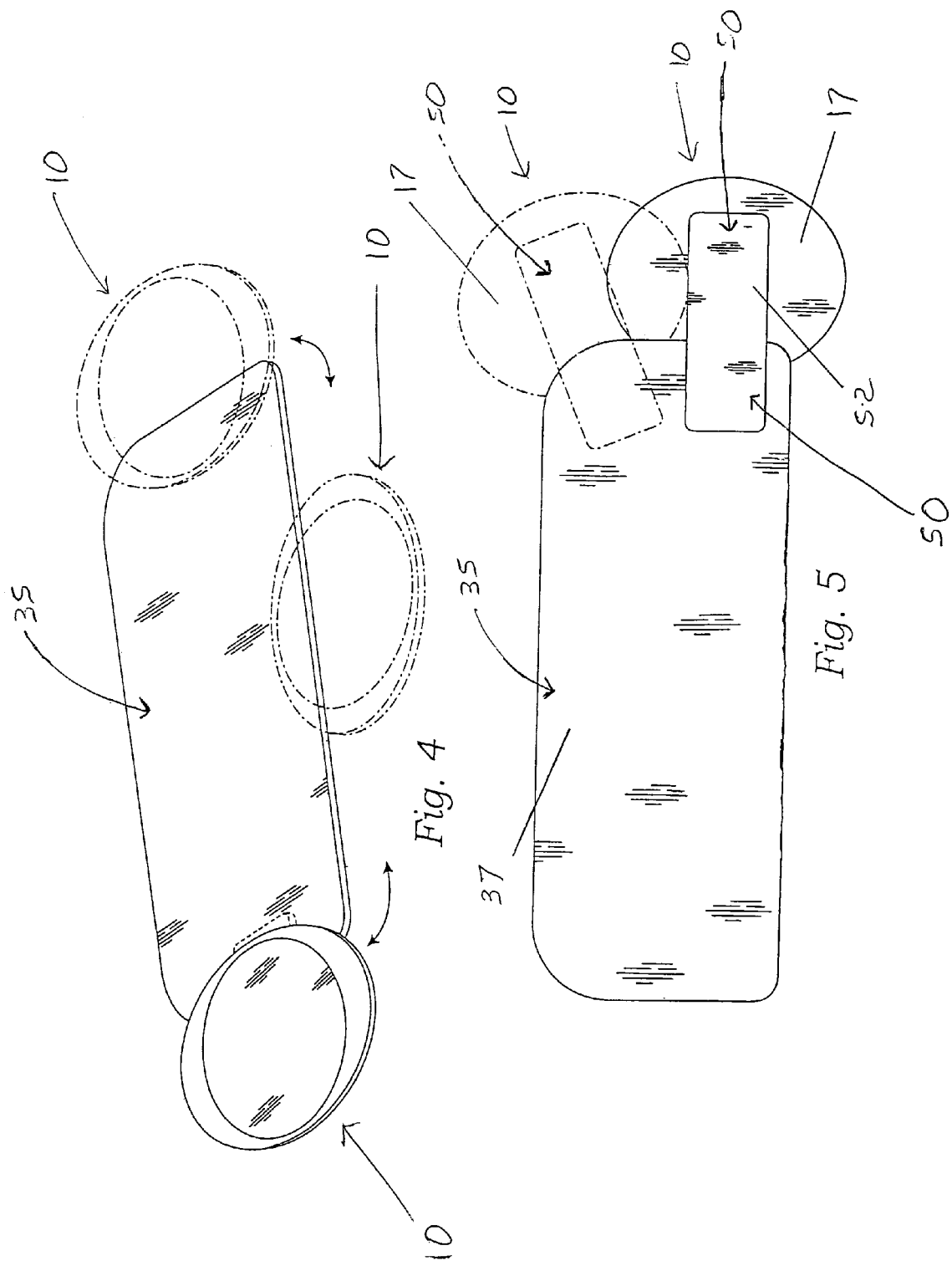

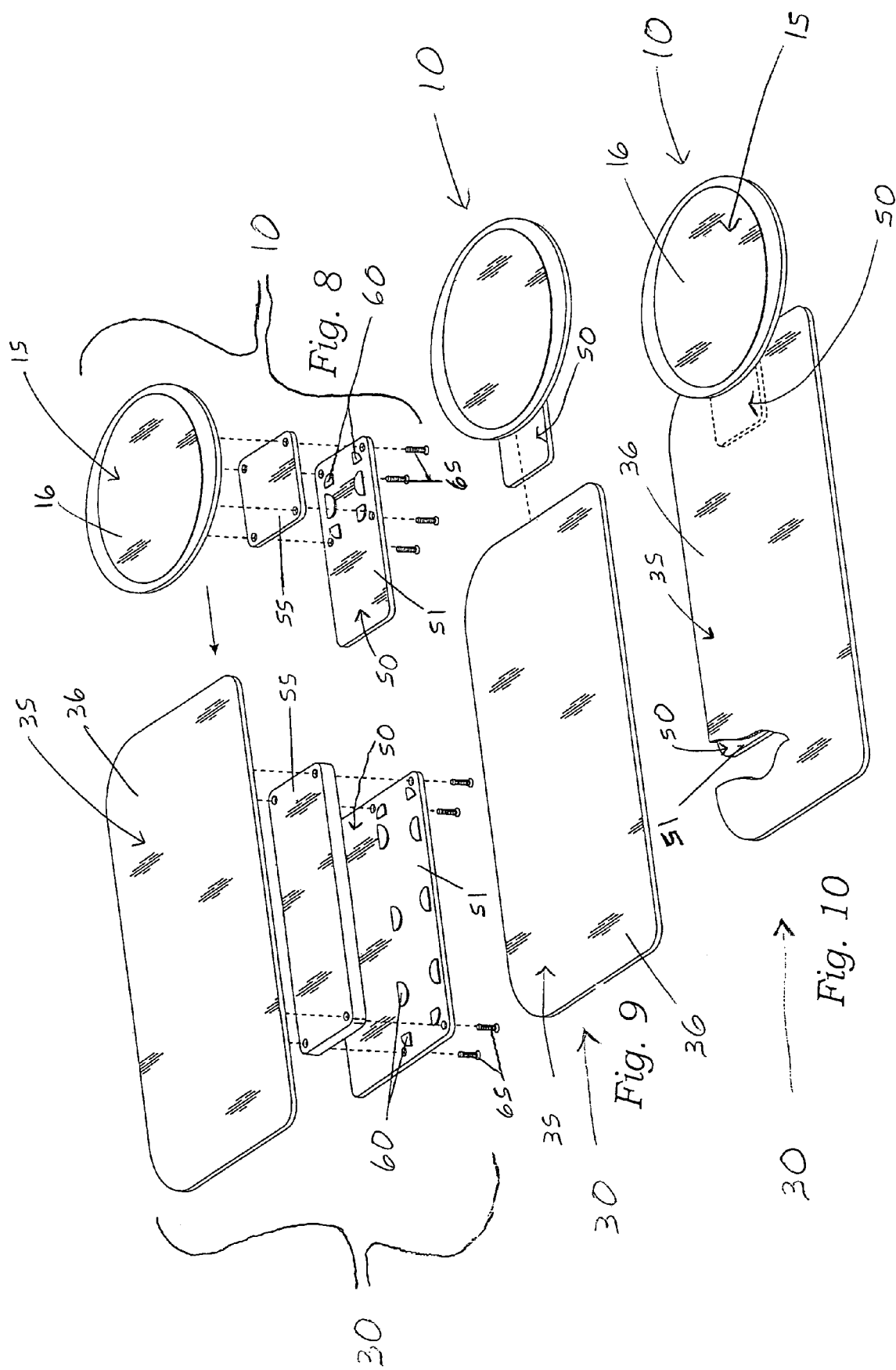

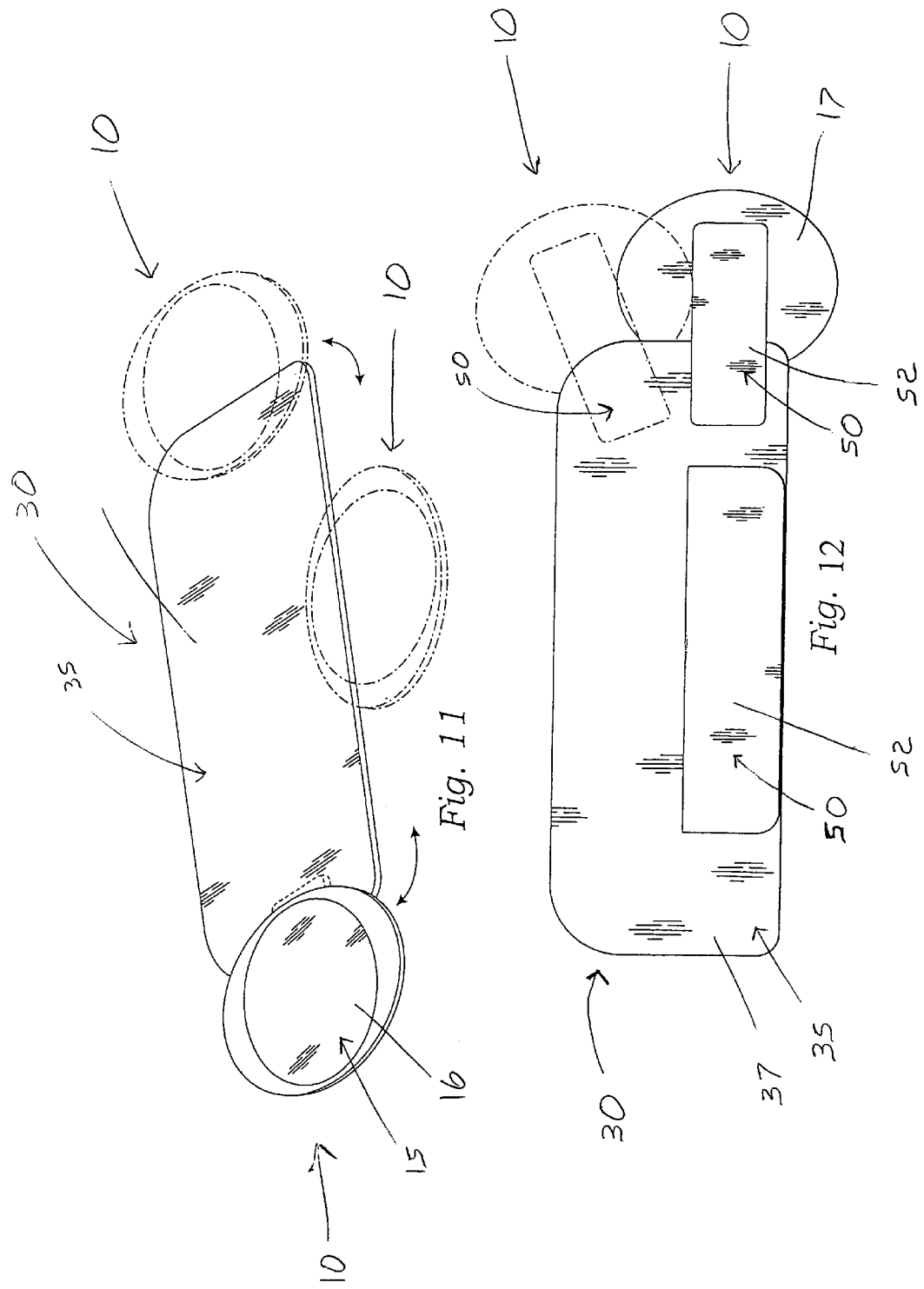

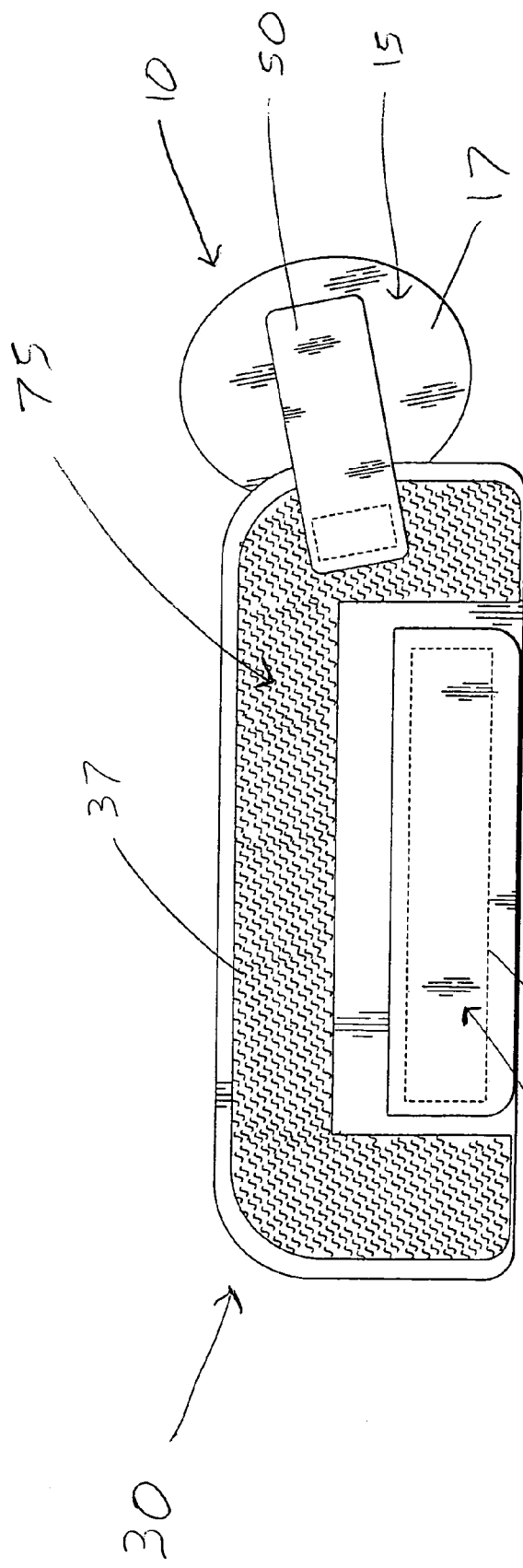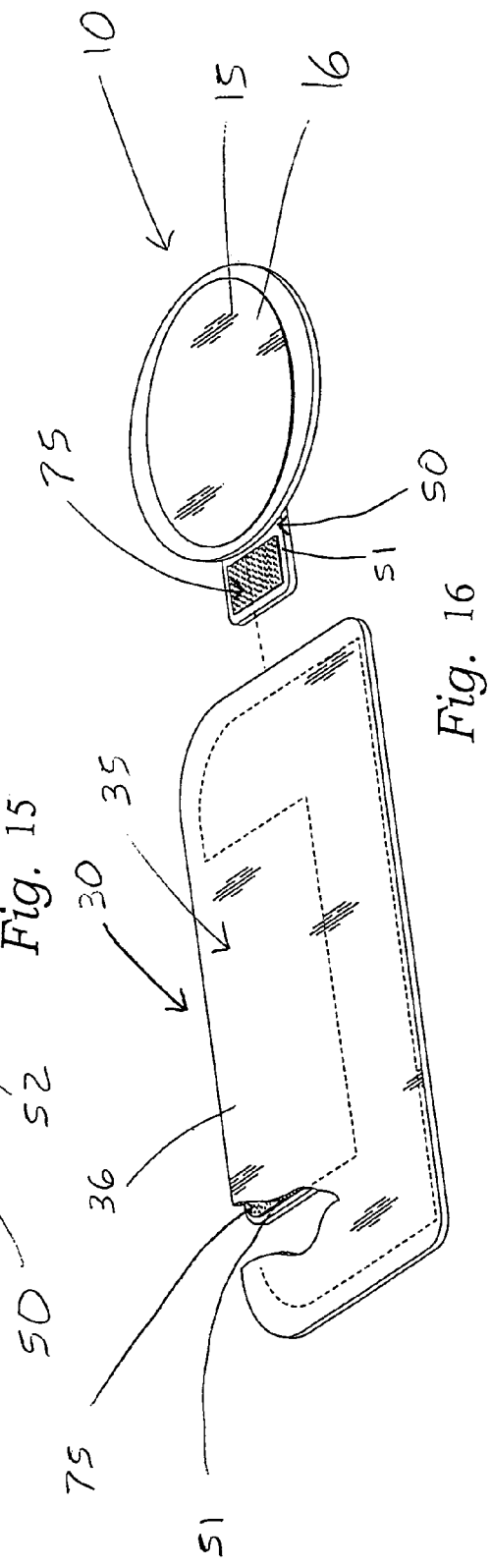
Fig. 15
Fig. 16

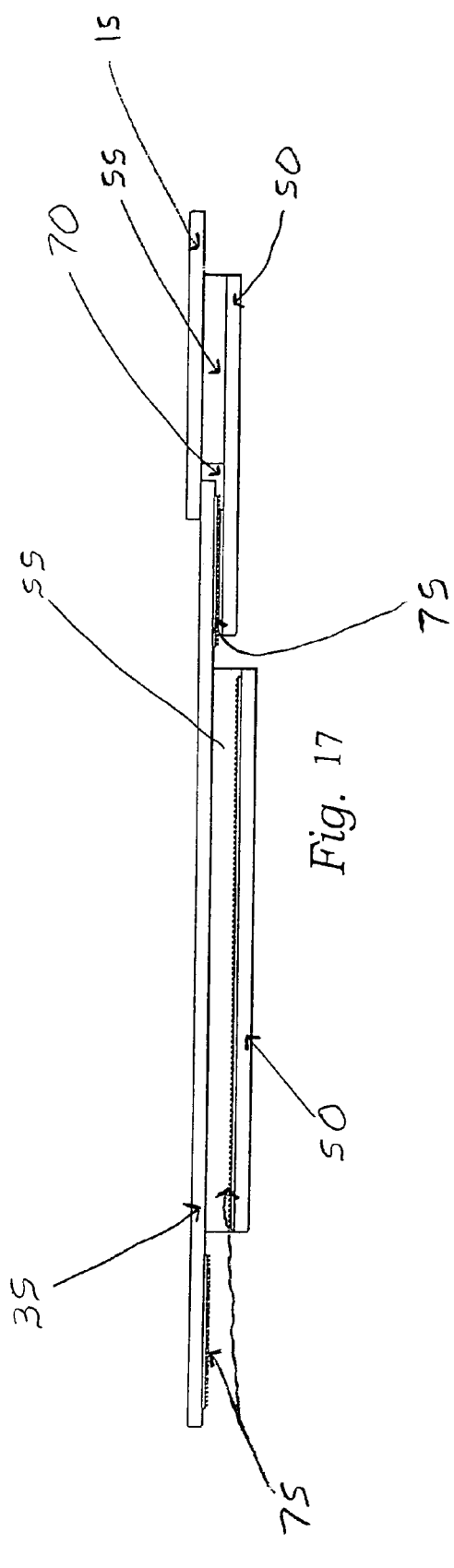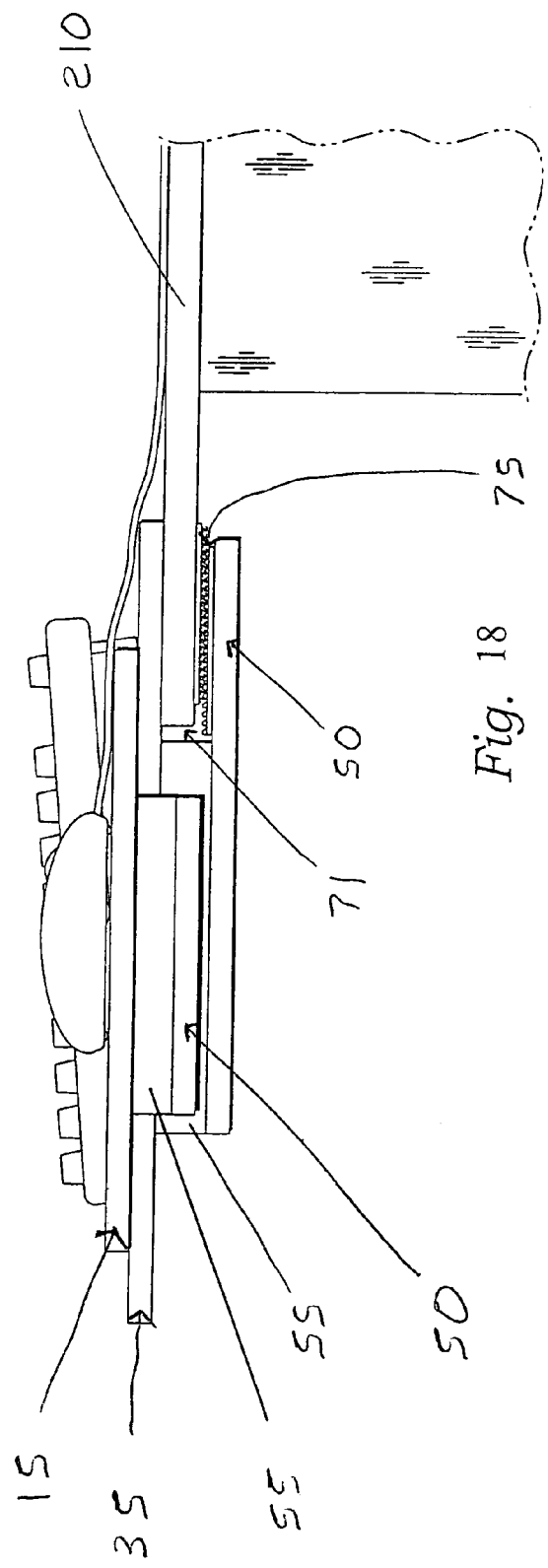

KEYBOARD AND MOUSE SUPPORT

FIELD OF THE INVENTION

The present invention relates generally to devices used in connection with office equipment. More particularly, the present invention is a device(s) for use with a computer a keyboard and/or a mouse.

BACKGROUND OF THE INVENTION

Personal computers of today are being utilized throughout the world in business as well as in the home. Among the component parts of a computer system are its keyboard and mouse. The keyboard and mouse usually rests on the desk in close proximity to the computer monitor or screen. However, it is not uncommon for the desk or work surface of the computer system to be cluttered or be just too small to be functional. Therefore, it is important to be able to adjust the location and position of the keyboard and/or mouse to provide greater space to work. The below U.S. patents allow for flexibility in positioning the keyboard and/or mouse to suit a user's ergonomic requirements.

The following U.S. Pat. Nos. 4,625,657; 4,706,919; 4,776,284; 4,843,987; 5,037,054; 6,523,797 and 6,601,812, deal with various constructions of the keyboard support device. Among them is an arm type mechanism that allows the user to adjustment the height of the Keyboard Support.

U.S. Pat. No. 5,667,320, discloses a keyboard, palm rest, and mouse tray positioning system. The device is adapted to mount on to a desk and for use with a computer keyboard or mouse. A stationary bracket is attached to the desk. A main housing component is movably engaged to the stationary bracket. In an alternative embodiment, the mouse support tray is movably connected to the main housing so that the user may adjust the position of the mouse support tray for optimal ergonomic use of the mouse.

U.S. Pat. No. 5,655,743, shows a keyboard tray that has a relatively flat mouse tray that slides out from a chamber within the keyboard tray. The mouse tray is designed so that it can project out of the right side and/or the left side of the keyboard tray for use by a right handed mouse user or a left handed mouse user respectively. Other similar device have also been patented in U.S. Pat. Nos. 6,045,098 and 6,497,391.

U.S. Pat. No. 6,694,895, shows a keyboard tray which has a mouse support on a slidable member. The slidable member allows for limited left-to-right and right-to-left movement to accommodate left hand and right hand usage.

Although the above prior art devices allow for flexibility in positioning the keyboard and/or mouse to suit a user's ergonomic requirements, none of the prior art has disclosed a device(s) where the mouse support and keyboard support are not permanently connected to one another but can be slidable connected to one another, if a user so intends. Further, none of the prior art has disclosed a device where no hardware is needed to mount the mouse support on to the keyboard support. The mouse support can be slidably connected to the keyboard support.

Additionally, none of the prior art discloses a mouse support that can be slidably connected to and slidable removed from a keyboard platform and then slidable reconnected to new position on the keyboard platform. By being able to adjust where the mouse support is slidably connected on to the keyboard platform, the mouse support can accommodate left hand and right hand users by connecting the mouse support to either the left side or right side of the keyboard platform. Additionally, the mouse support can also be slidably connected to the front of the keyboard support if desired.

Further, none of the prior art has disclosed a mouse support that is slidably connected to a keyboard platform that is attached to a height adjustment mechanism. By being able to adjust the height of the keyboard platform and also adjust where the mouse support device is slidably connected on the keyboard platform, a user's ergonomic needs can be constantly satisfied, where a user feels the need to adjust the keyboard support and/or mouse support devices.

Additionally, none of the prior art discloses a mouse support device that can be slidably connected to and slidably removed from either: (1) a table surface, (2) a desk surface, (3) a sliding desk tray, or (4) a keyboard platform. By being able to adjust where the mouse support device is slidably connected to, the table, desk or keyboard platform, the user can create a comfortable work space.

Furthermore, none of the prior art discloses a keyboard support device that can be slidably connected to and slidably removed from either: (1) a table surface, (2) a desk surface, or (3) a sliding desk tray. By being able to adjust where the keyboard support device is slidably connected too, any user's ergonomic requirements can be met.

SUMMARY OF THE INVENTION

It is an object of the present invention to develop a device for use with a computer system keyboard and/or mouse to allow its users to adjust the keyboard and/or mouse to a more comfortable location.

It is another object of the present invention to develop a device where the user can adjust the position of the mouse platform independently of the keyboard platform.

It is also an object of this invention to develop a mouse support and a keyboard platform that are not permanently connected to one another but can be slidably connected to one another as an option.

It is another object of this invention to provide a mouse support that can be slidably connected to and slidable removed from a keyboard platform and then slidably reconnected to a new position on said keyboard platform, if a user so desires.

It is also an object of this invention to provide a mouse support that can accommodate left hand and right hand usage by having the mouse support slidably connect to either the left side or right side of the keyboard platform accordingly. It is a further object of this invention to have a mouse support that can slidably connected to the front of the keyboard platform.

It is a further an object of this invention to provide a mouse support that is slidably connected to a keyboard platform that itself is attached to a height adjusting mechanism.

It is also an object of this invention to be able to adjust the height of the keyboard platform as well as where the mouse support device is slidably connected to the keyboard platform.

It is a further object of this invention to provide a mouse support that requires no hardware to mount the mousing support on to the keyboard platform.

It is also an object of this invention to provide a keyboard support that requires no hardware to mount the keyboard support on to a surface such as a table or desk.

It is yet another object of this invention to provide a mouse support that can be slidably connected to and slidably removed from (1) a table surface, (2) a desk surface, (3) a sliding desk tray, or (4) a keyboard platform.

It is also an object of this invention to provide a keyboard support device that can be slidably connected to and slidably removed from (1) a table surface, (2) a desk surface, or (3) a sliding desk tray.

It is an object of this invention to provide a mouse support and keyboard support device that is easy to manufacture, simple to assemble, reliable in operation, and relatively inexpensive to produce.

BRIEF DESCRIPTION OF DRAWINGS

These as well as other features of the present invention will become apparent upon reference to the accompanying drawings wherein like numerals designate corresponding parts in the several figures, summarized as follows:

FIG. 1 is a perspective view of an un-assembled mouse support and keyboard platform.

FIG. 2 is a perspective view of an assembled mouse support and keyboard platform.

FIG. 3 is a perspective view of an assembled mouse support slidably connected to the keyboard platform.

FIG. 4 is a top view of a keyboard platform slidably connected to a mouse support. This also shows that the mouse support can be slidably removed and slidably connected to other areas on the keyboard platform.

FIG. 5 is a bottom view of the keyboard platform slidably connected to a mouse support. The figure also shows that the mouse support can be slidably removed and then slidably reconnected to other areas on the keyboard platform.

FIG. 8 is a perspective view of an un-assembled mouse support and an un-assembled keyboard support.

FIG. 9 is a perspective view of an assembled mouse support and an assembled keyboard support.

FIG. 10 is a perspective view of an assembled mouse support slidably connected to a assembled keyboard support.

FIG. 11 is a top view of the keyboard platform slidably connected to a mouse support. The figure also shows that the mouse support can be slidably removed and slidably reconnected to the perimeter of the keyboard platform.

FIG. 12 is a bottom view of the keyboard platform slidably connected to a mouse support. The figure also shows that the mouse support can be slidably removed and then slidably reconnected to the perimeter of the keyboard platform.

FIG. 15 is a bottom view of the keyboard platform with velcro and a mouse support slidably connected to the keyboard platform. The figure also shows that the mouse support has velcro attached to the top of the support bar.

FIG. 16 is an overhead view of the mouse support and the keyboard support not slidably connected to one another. The mouse support has velcro attached to the top of the support bar and the keyboard support has velcro attached to the bottom of the keyboard platform.

FIG. 17 is a side view of the keyboard platform slidably connected to the mouse support. The figure shows that the mouse support has velcro attached to the top of the support bar and the keyboard support also has velcro attached to the bottom of the keyboard platform. When the keyboard platform is slidably connected to the mouse support, the velcro from the keyboard platform and the mouse support can reconnected to each other.

FIG. 18 is a is a side view of the keyboard platform slidably connected to a table surface. The figure shows that the support bar of the keyboard has velcro and that the bottom of the table surface also has velcro. When the keyboard platform is slidably connected to the mouse support, the velcro from the support bar of the keyboard and the bottom of the table are connected together. The figure also show that the mouse support is slidably connected to the keyboard support.

Figure 6:
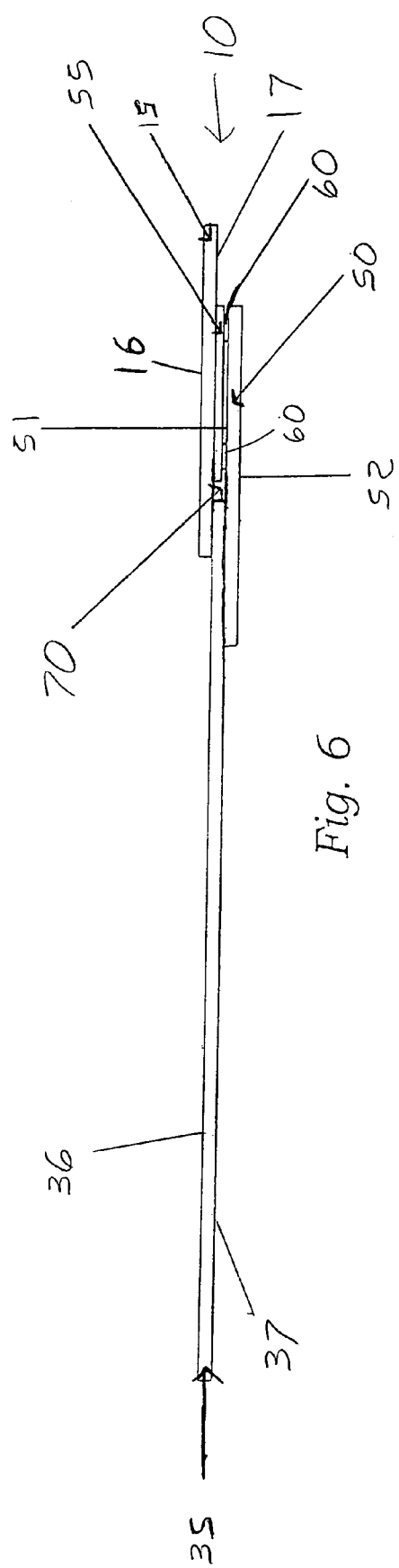
FIG. 6 is a side view of the keyboard platform slidably connected to a mouse support.

Other features and advantages of the invention will become apparent from the following detailed description, taken in conjunction with the accompanying drawings, which illustrate, by way of example, various features of embodiments of the invention.

DETAILED DESCRIPTION OF PREFERRED EMBODIMENT

The following detailed description and accompanying drawings are provided for the purpose of illustrating and describing presently preferred embodiments of the present invention and are not intended to limit the scope of the invention in anyway. It will be understood that various changes in the details, material arrangements of parts or operational conditions which have been herein described and illustrated in order to explain the nature of the invention may be made by those skilled in the art within the principles and scope of this invention.

Referring to the drawings more particularly by reference numbers, FIGS. 1-7 show the Mouse Support Device 10 and keyboard platform 35 of the present invention.

In accordance with the preferred embodiment, FIG. 1 shows an unassembled mouse support device 10 of the present invention comprising: a mouse platform 15 having a top surface 16 and a bottom surface 17, a support bar 50 having a top surface 51 and a bottom surface 52, a spacer 55 which is positioned between said bottom surface of said mouse platform 15 and said top surface of said support bar 50, one or more gaskets 60 positioned against said spacer 55, and connecting means 65 for attaching said mouse platform 15, said spacer 55 and said support bar 50 to one another.

The Mouse Support Device, as shown in FIG. 1 utilizes connecting means 65 such as screws for attaching the mouse platform 15, spacer 55 and support bar 50 to one another.

In the preferred embodiment of this invention when the mouse platform 15, the spacer 55, and the support bar 50 are connected to one another, a slot 70 is created in said Mouse Support Device between said bottom surface 17 of said mouse platform 15 and said top surface 51 of said support bar 50. The size of the slot 70 that is created, is directly related to the size of the spacer 55 and gaskets 60.

The slot 70 created in the Mouse Support Device 10 allows the device to be slidably connected to and slidably removed from a surface wherein said surface is a desk surface 205, a sliding desk tray surface, table surface 210, or a keyboard platform surface 35. In order for the Mouse Support Device 10 to be able to slidably connect to the surface, the surface must be slightly thinner than said slot 70 created between said bottom surface 17 of said mouse platform 15 and said top surface 51 of said support bar 50.

In the preferred embodiment of this invention as seen in FIGS. 1-7, the keyboard platform 35 is one millimeter thinner than the slot 70 created between said bottom surface 17 of said mouse platform 15 and said top surface 51 of said support bar 50. By having the keyboard platform 35 one millimeter thinner than the slot 70 created between the mouse platform 15 and the support bar 50 a snug fit can be achieved, when the keyboard platform 35 is slidably connected to the Mouse Support Device 10. In the preferred embodiment, the keyboard platform 35 is slightly thinner than the spacer 55.

It should be kept in mind that the keyboard platform 35 can be more than one millimeter thinner than the slot 70 created between said bottom surface 17 of said mouse platform 15 and said top surface 51 of said support bar 50. Since, the Mouse Support Device 10 has a long support bar 50 that will provide stability, it is not essential that a snug fit be achieved between the Mouse Support Device 10 and the keyboard platform 35 when they are slidably connected. Additionally, if the Mouse Support Device 10 is not securely connected with the keyboard platform 35, velcro 75 can be utilized to provide stability as seen in FIGS. 15-18.

In the preferred embodiment of this invention, the spacer 55 is cut into a rectangular shape. However, in an alternative embodiment not shown, the spacer 55 is cut into four circles which are positioned between said bottom surface of said mouse platform 15 and said top surface of said support bar 50. The spacer 55 as shown above still has one or more gaskets 60 positioned against it and connecting means 65 for attaching said mouse platform 15, said spacer 55 and said support bar 50 to one another. The keyboard platform 35 would still have to be slightly thinner than the slot 70.

FIGS. 1, 2, and 3 show a perspective view of a Mouse Support Device 10 and keyboard platform 35. FIG. 1 is an unassembled Mouse Support Device that is assembled in FIG. 2 and then slidably connected to the keyboard platform in FIG. 3.

FIGS. 4 and 5 show a Mouse Support Device 10 that can accommodate left hand and right hand usage by having the mouse support 10 slidably connect to either the left side or right side of the keyboard platform 35. Additionally, the Mouse Support Device 10 can also be slidably connected to the front or back of the keyboard platform 35. And FIG. 6 shows a side view of the Mouse Support Device 10 slidably connected to the keyboard platform 35.

Figure 7:
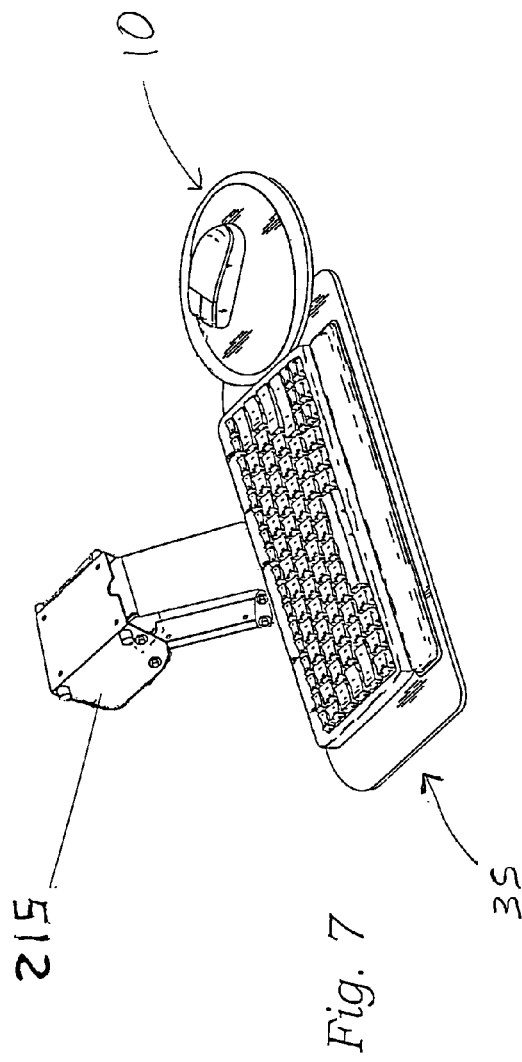
FIG. 7 is a perspective view of the keyboard platform slidably connected to a mouse support. The figure also shows that the keyboard platform is attached to a height adjustable mechanism. A computer keyboard is positioned on the keyboard platform. A computer mouse is positioned on the mouse support.

The preferred embodiment of this invention is shown in FIG. 7, which shows a Mouse Support Device 10 that is slidably connected to a keyboard platform 35 that itself is attached to a height adjusting mechanism 215. The inventor regards this as the preferred embodiment of the invention since a user is able to adjust the height of the keyboard platform 35 as well as where the mouse support device 10 is slidably connected to on the keyboard platform 35. Thereby, satisfy any user's ergonomic needs.

FIGS. 8-14 shows an alternative embodiment of the present invention where the Mouse Support Device 10 is connected to a Keyboard Support Device 30.

FIG. 8 shows an unassembled Keyboard Support Device and also an unassembled Mouse Support Device. The Keyboard Support device will be discussed now whereas the Mouse Support Device will be discussed below.

The Keyboard Support Device 30 of the present invention is comprised of: a Keyboard platform 35 having a top surface 36 and a bottom surface 37, a support bar 50 having a top surface 51 and a bottom surface 52, a spacer 55 which is positioned between said bottom surface 37 of said keyboard platform 35 and said top surface 51 of said support bar 50, one or more gaskets 60 positioned against said spacer 55, and connecting means 65 for attaching said mouse platform 15, said spacer 55 and said support bar 50 to one another.

The Keyboard Support Device 30 and the Mouse Support Device 10, are shown in FIG. 8 utilizes connecting means 65 such as screws for attaching the mouse platform 15, spacer 55 and support bar 50 to one another.

In this embodiment of this invention when keyboard platform 15, the spacer 55, and the support bar 50 are connected to one another, a slot 71 is created in the Keyboard Support Device 30 between said bottom surface 37 of said keyboard platform 35 and said top surface 51 of said support bar 50. The size of the slot 71 that is created, is directly related to the size of the spacer 55 and gaskets 60.

The slot 71 created in the Keyboard Support Device 30 allows the device to be slidably connected to and slidably removed from a surface 200 wherein said surface is a desk surface 205, a sliding desk tray surface, or table surface 210. In order for the Keyboard Support Device 30 to be able to slidably connect to the surface, the surface must be slightly thinner than said slot 71 created between said bottom surface 37 of said keyboard platform 35 and said top surface 51 of said support bar 50.

Figure 14:
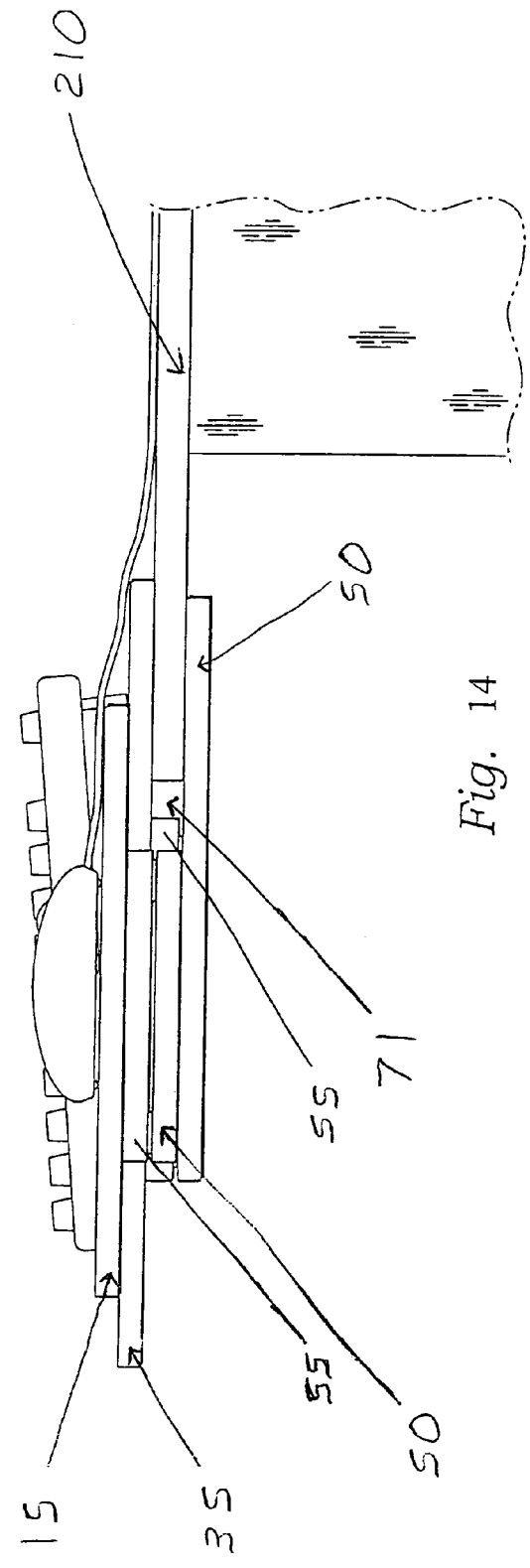
FIG. 14 is a side view of the keyboard platform slidable connected to a table surface. The figure also shows the mouse support slidably connected to the keyboard support.

In this embodiment of this invention as seen in FIG. 14, the table surface 210 is one millimeter thinner than the slot 71 created between said bottom surface 37 of said keyboard platform 35 and said top surface 51 of said support bar 50. By having the keyboard platform 35 one millimeter thinner than the slot 71 created between the keyboard platform 35 and the support bar 50 a snug fit can be achieved, when the Keyboard Support Device 30 is slidably connected to the table surface 210. In this embodiment, the table surface 210 is slightly thinner than the spacer 55.

It should be kept in mind that the table surface 210 can be more than one millimeter thinner than the slot 71 created between said bottom surface 37 of said keyboard platform 35 and said top surface 51 of said support bar 50. Since, the Keyboard Support Device 30 has a long support bar 50 that will provide stability, it is not essential that a snug fit be achieved between the Keyboard Support Device 30 and the table surface when they are slidably connected. Additionally, if the Keyboard Support Device 30 is not securely connected with the table surface 210, velcro can be utilized to provide stability as seen in FIG. 18.

As mentioned above, FIG. 8 shows an unassembled Keyboard Support Device and also an unassembled Mouse Support Device. The Mouse Support Device 10 of the present invention is comprised of: a mouse platform 15 having a top surface 16 and a bottom surface 17, a support bar 50 having a top surface 51 and a bottom surface 52, a spacer 55 which is positioned between said bottom surface 17 of said mouse platform 15 and said top surface 51 of said support bar 50, one or more gaskets 60 positioned against said spacer 55, and connecting means 65 for attaching said mouse platform 15, said spacer 55 and said support bar 50 to one another.

In this embodiment of this invention when the mouse platform 15, the spacer 55, and the support bar 50 are connected to one another, a slot 70 is created in the Mouse Support Device 10 between said bottom surface 17 of said mouse platform 15 and said top surface 51 of said support bar 50.

The slot 70 created in the Mouse Support Device 10 allows the device to be slidably connected to and slidably removed from a surface wherein said surface is a desk surface 205, a sliding desk tray surface, table surface 210, or a keyboard platform surface 35. In order for the Mouse Support Device 10 to be able to slidably connect to the surface, the surface must be slightly thinner than said slot 70 created between said bottom surface 17 of said mouse platform 15 and said top surface 51 of said support bar 50.

In this embodiment of this invention as seen in FIGS. 8-14, the keyboard platform 35 is one millimeter thinner than the slot 70 created between said bottom surface 17 of said mouse platform 15 and said top surface 51 of said support bar 50. By having the keyboard platform 35 one millimeter thinner than the slot 70 created between the mouse platform 15 and the support bar 50 a snug fit can be achieved, when the keyboard platform 35 is slidably connected to the Mouse Support Device 10.

It should be kept in mind that the keyboard platform 35 can be more than one millimeter thinner than the slot 70 created between said bottom surface 17 of said mouse platform 15 and said top surface 51 of said support bar 50. Since, the Mouse Support Device 10 has a long support bar 50 that will provide stability, it is not essential that a snug fit be achieved between the Mouse Support Device 10 and the keyboard platform 35 when they are slidably connected. Additionally, if the Mouse Support Device 10 is not securely connected with the keyboard platform 35, velcro 75 can be utilized to provide stability as seen in FIGS. 15-18.

FIGS. 8, 9, and 10 show a perspective view of a Mouse Support Device 10 and Keyboard Support Device 30. FIG. 8 is an unassembled Keyboard Support Device and a unassembled Mouse Support Device that are assembled in FIG. 9 and then Mouse Support Device is slidably connected to the keyboard platform in FIG. 10.

Figure 13:
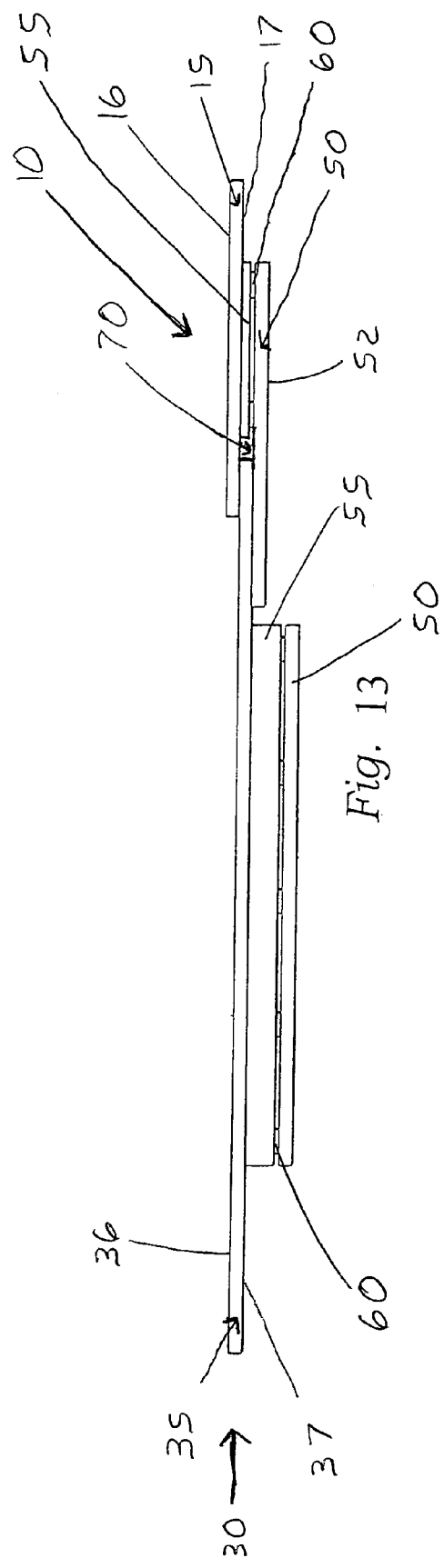
FIG. 13 is a side view of the keyboard platform slidable connected to a mouse support.

FIGS. 11 and 12 show a Mouse Support Device 10 that can accommodate left hand and right hand usage by having the mouse support 10 slidably connect to either the left side or right side of the keyboard platform 35. Additionally, the Mouse Support Device 10 can also be slidably connected to the front or back of the keyboard platform 35. And FIG. 13 shows a side view of the Mouse Support Device 10 slidably connected to the keyboard platform 35.

In an alternative embodiment of this invention, as shown in FIGS. 15-18, the Mouse Support Device 10 has velcro 75 attached to the top surface 51 of the support bar 50 and the Keyboard platform 35 also has velcro 75 attached to the bottom surface 37 of the keyboard platform 35. If the Mouse Support Device 10 is not securely connected with the keyboard platform 35, velcro 75 can be utilized to provide stability.

In an alternative embodiment of this invention, as shown in FIGS. 17 and 18, the Keyboard Support Device 30 has velcro 75 attached to the top surface 51 of the support bar 50 and in FIG. 18 the table surface 210 also has velcro 75 attached to the bottom surface 212 of the table surface 210. If the Keyboard Support Device 30 is not securely connected with the table surface 210, velcro 75 can be utilized to provide stability.

Figure 19:
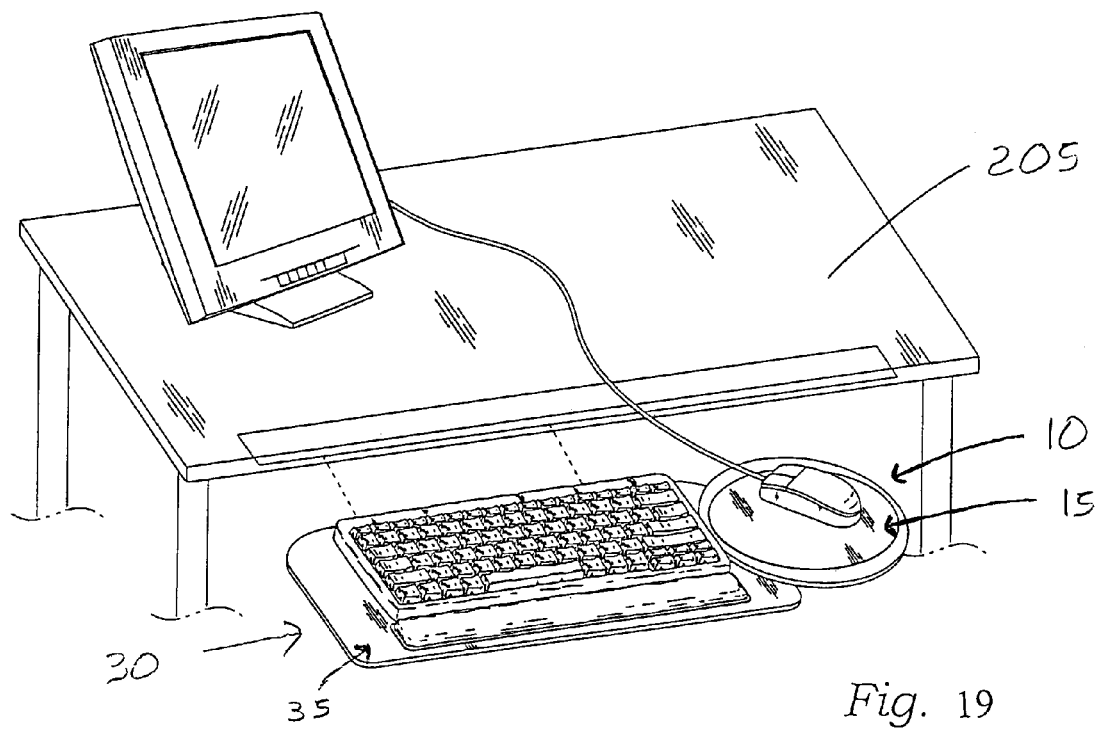
FIG. 19 is perspective view of a mouse support that is slidably connected to the keyboard platform. The figure shows that the keyboard support is not slidably connected to the desk.
Figure 20:
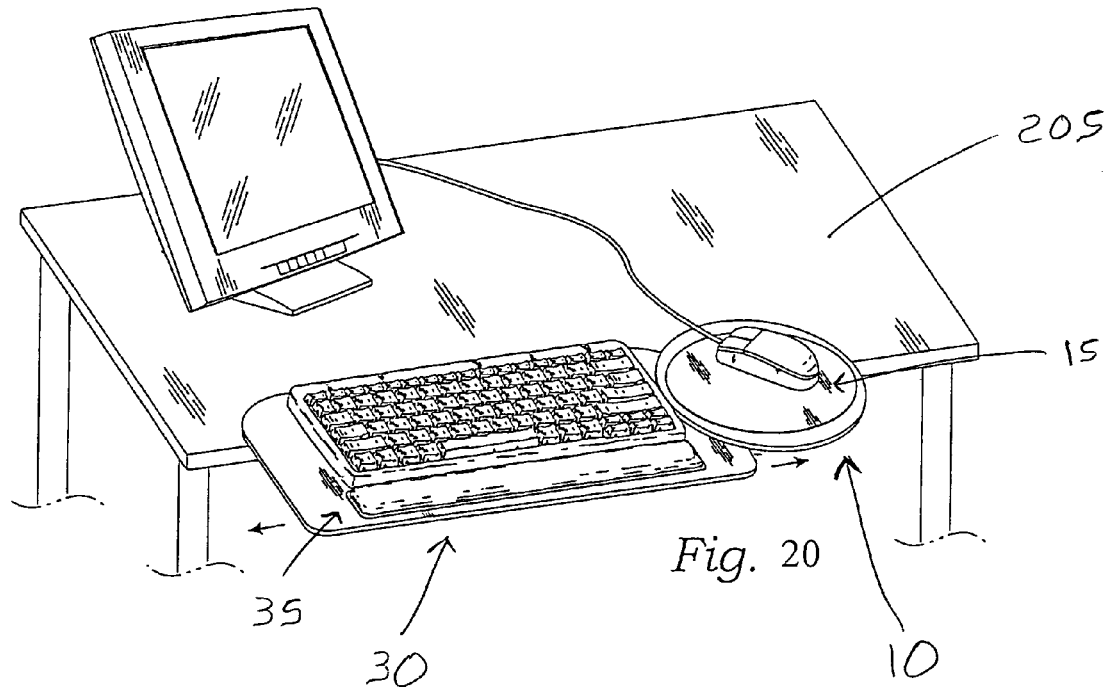
FIG. 20 is a perspective view of the keyboard support which is slidably connect to a desk. The figure also shows that the mouse support is slidably connected to the keyboard platform.

FIGS. 19 and 20 are perspective view of a Mouse Support Device 10 that is slidably connected to the keyboard platform 35. FIG. 19 shows where the Keyboard Support Device 30 can be connected to on the desk 205. FIG. 20 shows the Keyboard Support Device 30 connect to a desk 205.

In the preferred embodiment of this invention, the Keyboard Support Device 30 and Mouse Support Device 10 can be made out of any rigid flat material that is cut to a rectangular shape for the keyboard platform 35 and a smaller rectangle or oval for the mouse platform 15, out of the same material. It should be kept in mind that the shape of the keyboard and mouse platforms can be varied as along as the keyboard and mouse platforms are able to support a keyboard and a mouse.

In the preferred embodiment of this invention, the spacer 55 and support bar 50 are cut to a rectangular shape. It should be kept in mind that the shape of the spacer 55 and support bar 50 can be varied.

Additionally, in the preferred embodiment of this invention, the gaskets 60 are made of rubber or a rubber like material. The thin gaskets allows for the opening and closing of the slot 70 in the Mouse Support Device 10 and also for the slot 71 in the Keyboard Support Device 30.

While the description above refers to particular embodiments of the present invention, it will be understood that modifications may be made without departing from the spirit thereof. The presently disclosed embodiments are therefore to be considered in all respects as illustrative and not restrictive.

What is claimed is:

1. A mouse and keyboard support device comprising:
   a keyboard platform having a top surface and a bottom surface;
   said top surface of said keyboard platform is adopted to support a computer keyboard;
   a mouse support assembly comprising a mouse platform having a top surface and a bottom surface, said top surface of said mouse platform is adopted to support a computer mouse, a support bar having a top surface and a bottom surface, and a spacer, which is positioned between said bottom surface of said mouse platform and said top surface of said support bar, and one or more gaskets positioned against said spacer, and means for connecting said mouse platform, said spacer and said support bar to one another;
   wherein said mouse platform, said spacer, and said support bar are connected to one another, a slot is created in said mouse support between said bottom surface of said mouse platform and said top surface of said support bar, and wherein a keyboard platform is thinner than said slot created between said bottom surface of said mouse platform and said top surface of said support bar and said keyboard platform is slidably connected into said slot of said mouse support, and said keyboard platform and said mouse support are securely connected to one another,
   wherein a user wants to move said mouse support, said mouse support is slidably removed from said keyboard platform, and then slidable reconnected to said keyboard platform.

2. A mouse and keyboard support device as recited in claim 1, wherein said keyboard platform is attached to a desk surface.

3. A mouse and keyboard support device as recited in claim 1, wherein said keyboard platform is attached to a sliding desk tray.

4. A mouse and keyboard support device as recited in claim 1, wherein said keyboard platform is attached to a table surface.

5. A mouse and keyboard support device as recited in claim 1, wherein said keyboard platform is attached to a height adjustable mechanism.

6. A mouse and keyboard support device as recited in claim 1, wherein said top surface of said support bar and said bottom surface of said keyboard platform have velcro attached to thereto;

wherein said mouse support assembly is slidably connected to said keyboard platform, said velcro on said keyboard platform and on said mouse support provides an additional means to securely lock said keyboard platform and said mouse support to one another.

7. A mouse and keyboard support device comprising:

a keyboard support assembly comprising a keyboard platform having a top surface and a bottom surface, said top surface of said keyboard platform is adopted to support a computer keyboard, a keyboard support bar having a top surface and a bottom surface, and a keyboard spacer, which is positioned between said bottom surface of said keyboard platform and said top surface of said keyboard support bar, and one or more gaskets positioned against said keyboard spacer, and means for connecting said keyboard platform, said keyboard spacer and said keyboard support bar to one another;

a mouse support assembly comprising a mouse platform having a top surface and a bottom surface, said top surface of said mouse platform is adopted to support a computer mouse, a mouse support bar having a top surface and a bottom surface, and a mouse spacer, which is positioned between said bottom surface of said mouse platform and said top surface of said mouse support bar, and one or more gaskets positioned against said mouse spacer, and means for connecting said mouse platform, said mouse spacer and said mouse support bar to one another;

wherein said keyboard platform, said keyboard spacer, and said keyboard support bar are connected to one another, a slot is created in said keyboard support assembly between said bottom surface of said keyboard platform and said top surface of said keyboard support bar;

wherein said mouse platform, said mouse spacer, and said mouse support bar are connected to one another, a slot is created in said mouse support assembly between said bottom surface of said mouse platform and said top surface of said mouse support bar.

8. A mouse and keyboard support device as recited in claim 7, wherein said slot of said keyboard support is slidably connected to a surface wherein said surface is a desk surface, a sliding desk tray surface, or a table surface, and said desk surface, said sliding desk tray surface, and said table surface is slightly thinner than said slot created between said bottom surface of said keyboard platform and said top surface of said keyboard support bar; said desk surface, said sliding desk tray surface, and said table surface are securely locked into place in said slot of said keyboard support to provides a stable surface for said computer keyboard.

9. A mouse and keyboard support device as recited in claim 7, wherein said slot of said mouse support assembly is slidably connected to a surface wherein said surface is a desk surface, a sliding desk tray surface, a table surface or said keyboard platform and said desk surface, said sliding desk tray surface, said table surface and said keyboard platform is slightly thinner than said slot created between said bottom surface of said keyboard platform and said top surface of said keyboard support bar; said desk surface, said sliding desk tray surface, said table surface, and said keyboard platform are securely locked into place in said slot of said mouse support assembly to provides a stable surface for said computer mouse.

* * * * *